United States Patent
Hodge

(10) Patent No.: US 10,757,268 B2
(45) Date of Patent: *Aug. 25, 2020

(54) CALL PROCESSING SYSTEM FOR MODIFYING INMATE COMMUNICATION LIMITS

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,387

(22) Filed: Dec. 31, 2018

(65) Prior Publication Data

US 2019/0312978 A1 Oct. 10, 2019

Related U.S. Application Data

(63) Continuation of application No. 15/879,026, filed on Jan. 24, 2018, now Pat. No. 10,171,680, which is a
(Continued)

(51) Int. Cl.
*H04M 15/00* (2006.01)
*H04M 3/42* (2006.01)
*H04M 3/38* (2006.01)

(52) U.S. Cl.
CPC .......... *H04M 15/705* (2013.01); *H04M 3/38* (2013.01); *H04M 3/42102* (2013.01);
(Continued)

(58) Field of Classification Search
CPC .... H04M 7/0078; H04M 61/308; H04M 3/54; H04M 3/56; H04M 3/428; H04M 3/2281;
(Continued)

(56) References Cited

U.S. PATENT DOCUMENTS

| 3,246,756 A * | 4/1966 | Binnix ..................... B03B 4/06 209/475 |
| 4,054,756 A | 10/1977 | Comella et al. |

(Continued)

OTHER PUBLICATIONS

"Bellcore Notes on the Networks (Formerly BOC Notes on the LEC Networks)," Bellcore, Special Report SR-2275, Issue 3, Dec. 1997.
(Continued)

*Primary Examiner* — Binh Kien Tieu
(74) *Attorney, Agent, or Firm* — Sterne, Kessler, Goldstein & Fox P.L.L.C.

(57) ABSTRACT

A system for customizing time limits for inmate communications in a correctional facility is disclosed. The system includes a profile subsystem that stores an inmate profile of the inmate and a communication processing subsystem comprising one or more processors configured to receive data of an inmate communication of an inmate, identify a type of communication device of the inmate and a call recipient of the inmate communication based on the data of the inmate communication, retrieve the inmate profile of the inmate form the profile subsystem, identify a plurality of behaviors of the inmate based on the inmate profile, determine a time limit based on at least one of the type of communication device, the call recipient of the inmate communication, and the plurality of behaviors of the inmate, and assign the time limit to the inmate communication of the inmate.

20 Claims, 6 Drawing Sheets

Related U.S. Application Data continuation of application No. 15/639,798, filed on Jun. 30, 2017, now Pat. No. 9,912,821.

(52) U.S. Cl.
CPC .......... *H04M 15/00* (2013.01); *H04M 15/47* (2013.01); *H04M 15/725* (2013.01); *H04M 15/775* (2013.01); *H04M 15/85* (2013.01); *H04M 15/852* (2013.01); *H04M 15/853* (2013.01); *H04M 15/854* (2013.01); *H04M 15/88* (2013.01); *H04M 15/882* (2013.01); *H04M 15/883* (2013.01); *H04M 15/887* (2013.01)

(58) Field of Classification Search
CPC .......... H04M 15/705; H04M 3/42102; H04M 15/725; H04M 15/854; H04M 15/887; H04M 15/775; G06F 17/30035; G06F 17/30905; H04L 61/308; H04L 65/1006; H04L 65/608; H04L 61/3085; G06Q 30/02; G06Q 30/267; G06Q 40/00; B03B 4/06
USPC ......... 379/32.01, 32.02, 92.03, 93.02, 93.03, 379/93.11, 93.17, 93.21, 93.22, 93.24, 379/111, 112.01, 112.06, 112.09, 114.01, 379/133, 207.03, 207.13, 207.14, 207.15
See application file for complete search history.

(56) References Cited

U.S. PATENT DOCUMENTS

| | | | |
|---|---|---|---|
| 4,191,860 A | 3/1980 | Weber | |
| 4,933,966 A | 6/1990 | Hird et al. | |
| 4,935,956 A | 6/1990 | Hellwarth et al. | |
| 5,319,702 A | 6/1994 | Kitchin et al. | |
| 5,371,842 A | 12/1994 | Easton et al. | |
| 5,469,370 A | 11/1995 | Ostrover et al. | |
| 5,539,812 A | 7/1996 | Kitchin et al. | |
| 5,570,417 A | 10/1996 | Byers | |
| 5,655,013 A | 8/1997 | Gainsboro | |
| 5,768,355 A | 6/1998 | Salibrici et al. | |
| 5,778,313 A | 7/1998 | Fougnies | |
| 5,854,975 A | 12/1998 | Fougnies et al. | |
| 5,883,945 A | 3/1999 | Richardson, Jr. et al. | |
| 5,923,746 A | 7/1999 | Baker et al. | |
| 5,926,533 A | 7/1999 | Gainsboro | |
| 5,991,376 A | 11/1999 | Hennessy et al. | |
| 6,002,427 A | 12/1999 | Kipust | |
| 6,016,343 A | 1/2000 | Hogan et al. | |
| 6,052,454 A | 4/2000 | Kek et al. | |
| 6,570,970 B2 | 5/2003 | Gruchala et al. | |
| 6,636,591 B1 * | 10/2003 | Swope .................. | H04M 15/00 379/114.12 |
| 6,639,977 B1 | 10/2003 | Swope et al. | |
| 6,647,096 B1 | 11/2003 | Milliorn et al. | |
| 6,668,045 B1 | 12/2003 | Mow | |
| 6,690,950 B2 | 2/2004 | Takagi et al. | |
| 6,728,345 B2 | 4/2004 | Glowny et al. | |
| 6,819,932 B2 | 11/2004 | Allison et al. | |
| 6,850,609 B1 | 2/2005 | Schrage | |
| 6,970,554 B1 | 11/2005 | Peterson et al. | |
| 7,005,993 B2 | 2/2006 | Webb et al. | |
| 7,046,779 B2 | 5/2006 | Hesse | |
| 7,076,031 B1 | 7/2006 | Bress et al. | |
| 7,079,636 B1 | 7/2006 | McNitt et al. | |
| 7,079,637 B1 | 7/2006 | McNitt et al. | |
| 7,106,843 B1 | 9/2006 | Gainsboro et al. | |
| 7,134,130 B1 | 11/2006 | Thomas | |
| 7,164,757 B2 | 1/2007 | Link | |
| 7,197,560 B2 | 3/2007 | Caslin et al. | |
| 7,256,816 B2 | 8/2007 | Profanchik et al. | |
| 7,333,798 B2 | 2/2008 | Hodge | |
| 7,496,345 B1 | 2/2009 | Rae et al. | |
| 7,505,406 B1 | 3/2009 | Spadaro et al. | |
| 7,529,357 B1 | 5/2009 | Rae et al. | |
| 7,551,732 B2 | 6/2009 | Anders | |
| 7,742,581 B2 | 6/2010 | Hodge et al. | |
| 7,742,582 B2 | 6/2010 | Harper | |
| 7,783,021 B2 | 8/2010 | Hodge | |
| 7,805,457 B1 | 9/2010 | Viola et al. | |
| 7,809,170 B2 | 10/2010 | Phoha | |
| 7,853,243 B2 | 12/2010 | Hodge | |
| 7,860,222 B1 | 12/2010 | Sidler et al. | |
| 7,881,446 B1 | 2/2011 | Apple et al. | |
| 7,899,167 B1 | 3/2011 | Rae | |
| 7,961,860 B1 | 6/2011 | McFarlen | |
| 7,965,821 B2 * | 6/2011 | Bouchard ........... | H04M 3/2281 370/260 |
| 8,014,800 B2 | 9/2011 | Törnkvist | |
| 8,098,804 B1 | 1/2012 | Rae et al. | |
| 8,135,115 B1 | 3/2012 | Hogg, Jr. et al. | |
| 8,180,028 B1 | 5/2012 | Falcone et al. | |
| 8,204,177 B2 | 6/2012 | Harper | |
| 8,351,593 B2 | 1/2013 | Vick et al. | |
| 8,428,559 B2 | 4/2013 | Silva | |
| 8,458,732 B2 | 6/2013 | Hanna et al. | |
| 8,488,756 B2 | 7/2013 | Hodge et al. | |
| 8,509,390 B2 | 8/2013 | Harper | |
| 8,577,003 B2 | 11/2013 | Rae | |
| 8,583,527 B2 | 11/2013 | Polozola et al. | |
| 8,626,118 B2 | 1/2014 | Smith et al. | |
| 8,644,466 B1 | 2/2014 | Dawson | |
| 8,855,280 B1 | 10/2014 | Passe et al. | |
| 8,976,949 B2 | 3/2015 | Torgersrud et al. | |
| 9,043,813 B2 | 5/2015 | Hanna et al. | |
| 9,077,680 B2 | 7/2015 | Harper | |
| 9,124,763 B2 | 9/2015 | Humphries | |
| 9,210,175 B2 | 12/2015 | Gupta | |
| 9,614,974 B1 | 4/2017 | Hodge et al. | |
| 9,692,889 B2 | 6/2017 | Rokosky et al. | |
| 9,912,821 B1 * | 3/2018 | Hodge .................. | H04M 15/88 |
| 9,948,886 B2 * | 4/2018 | Torgersrud ............ | H04N 7/147 |
| 10,171,680 B1 * | 1/2019 | Hodge ................. | H04M 15/705 |
| 10,412,125 B2 * | 9/2019 | Thomasson ......... | H04L 65/1046 |
| 2002/0067272 A1 | 6/2002 | Lemelson et al. | |
| 2002/0067810 A1 | 6/2002 | Barak et al. | |
| 2002/0073207 A1 | 6/2002 | Sidler et al. | |
| 2002/0095296 A1 | 7/2002 | Hind et al. | |
| 2002/0095415 A1 | 7/2002 | Walker et al. | |
| 2002/0118798 A1 | 8/2002 | Langhart et al. | |
| 2002/0183040 A1 | 12/2002 | Lundstrom et al. | |
| 2002/0194096 A1 | 12/2002 | Falcone et al. | |
| 2003/0002639 A1 | 1/2003 | Huie | |
| 2003/0046083 A1 | 3/2003 | Devinney, Jr. et al. | |
| 2003/0086546 A1 | 5/2003 | Falcone et al. | |
| 2004/0058667 A1 | 3/2004 | Pienmaki et al. | |
| 2004/0177276 A1 | 9/2004 | MacKinnon et al. | |
| 2005/0094794 A1 | 5/2005 | Creamer et al. | |
| 2005/0102371 A1 | 5/2005 | Aksu | |
| 2005/0114192 A1 | 5/2005 | Tor | |
| 2005/0141678 A1 | 6/2005 | Anders et al. | |
| 2005/0207357 A1 | 9/2005 | Koga | |
| 2005/0259809 A1 | 11/2005 | Hodge | |
| 2006/0098796 A1 | 5/2006 | Link | |
| 2006/0149644 A1 | 7/2006 | Salmar et al. | |
| 2006/0285650 A1 | 12/2006 | Hodge | |
| 2006/0294043 A1 | 12/2006 | Taisdeal | |
| 2007/0041545 A1 * | 2/2007 | Gainsboro .......... | H04M 3/2281 379/188 |
| 2007/0071206 A1 | 3/2007 | Gainsboro et al. | |
| 2007/0133437 A1 | 6/2007 | Wengrovitz et al. | |
| 2007/0155411 A1 | 7/2007 | Morrison | |
| 2008/0012760 A1 | 1/2008 | Derrick et al. | |
| 2008/0023543 A1 | 1/2008 | Beisang | |
| 2008/0201158 A1 | 8/2008 | Johnson et al. | |
| 2009/0067587 A1 | 3/2009 | Rokosky et al. | |
| 2009/0154675 A1 * | 6/2009 | Hanson ................ | G06Q 40/00 379/114.2 |
| 2009/0254392 A1 | 10/2009 | Zander | |
| 2010/0151820 A1 | 6/2010 | Mulherin et al. | |
| 2010/0299761 A1 | 11/2010 | Shapiro | |

(56) References Cited

U.S. PATENT DOCUMENTS

| | | | |
|---|---|---|---|
| 2011/0247045 | A1 | 10/2011 | Rajagopal et al. |
| 2013/0002433 | A1 | 1/2013 | Wilmeth et al. |
| 2013/0179949 | A1 | 7/2013 | Shapiro |
| 2013/0279668 | A1 | 10/2013 | Rokosky et al. |
| 2013/0279686 | A1 | 10/2013 | Keiser et al. |
| 2013/0304581 | A1 | 11/2013 | Soroca et al. |
| 2013/0340028 | A1 | 12/2013 | Rajagopal et al. |
| 2014/0033230 | A1 | 1/2014 | Hanna et al. |
| 2014/0066012 | A1* | 3/2014 | Sweeney ............... H04W 48/04 455/410 |
| 2015/0188925 | A1 | 7/2015 | Gupta |
| 2015/0358457 | A1 | 12/2015 | Hodge |
| 2016/0028786 | A1 | 1/2016 | Hanna et al. |
| 2016/0103996 | A1 | 4/2016 | Salajegheh et al. |
| 2016/0165393 | A1 | 6/2016 | Pang |
| 2016/0191484 | A1 | 6/2016 | Gongaware |
| 2016/0210607 | A1 | 7/2016 | Griffin |
| 2016/0248766 | A1 | 8/2016 | Tembey et al. |
| 2016/0309122 | A1 | 10/2016 | Kingery |
| 2016/0366147 | A1 | 12/2016 | Nguyen et al. |
| 2017/0374554 | A1 | 12/2017 | Byrne |

OTHER PUBLICATIONS

"Cisco IAD2400 Series Business-Class Integrated Access Device", Cisco Systems Datasheet, 2003.
"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html.
"PacketCable™ Audio/Video Codecs Specification," Cable Television Laboratories, Inc., Ser. No. PKT-SP-CODEC-I05-040113 (2004).
"SIP and IPLinkTM in the Next Generation Network: An Overview," Intel, 2001.
"The AutoEDMS Document Management and Workflow System: An Overview of Key Features, Functions and Capabilities," ACS Software, May 2003.
"Voice Over Packet in Next Generation Networks: An Architectural Framework," Bellcore, Special Report SR-4717, Issue 1, Jan. 1999.
"Criminal Calls: A Review of the Bureau of Prisons' Management of Inmate Telephone Privileges," U.S. Department of Justice, Office of the Inspector General, Aug. 1999.
"Why Can't You Make a Collect Call to a Cell Phone," National Public Radio, Jun. 30, 2008, Accessed via http://www.npr.org/templates/story/story.php?storyId=92021561 on Apr. 6, 2015.
1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.
1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.
Ahimovic et al., "Services for Tomorrow's PCS," IEEE International Conference on Universal Personal Communications, vol. 1, Oct. 12-15, 1993; pp. 222-227.
Appendices A-G of U.S. Appl. No. 60/377,763, filed May 3, 2002.
Assignment of U.S. Pat. No. 8,190,121 and U.S. Appl. No. 13/449,308.
Brown, et al., "SMS: The Short Message Service," Computer, vol. 40, No. 12, 2007.
BubbleLink® Software Architecture (Science Dynamics 2003).
Bur Goode, Voice Over Internet Protocol (VoIP), Proceedings of the IEEE, vol. 90, No. 9, 1495-1517 (Sep. 2002).
Clifford J. Weinstein, MIT, The Experimental Integrated Switched Network—a System-Level Network Test Facility (IEEE 1983).
Commander Call Control System, Rev. 1.04 (Science Dynamics 2002).
Confalone et al., "Calling Card Service—TSPS Hardware, Software, and Signaling Implementation," The Bell System Technical Journal, Sep. 1982, vol. 61, No. 7; pp. 1675-1714.

Definition of "telephony", McGraw-Hill Dictionary of Scientific and Technical Terms, 6th Edition (McGraw-Hill, 2003).
Definitions of "Local Area Network (LAN)" and "Wide Area Network (WAN)," Microsoft Computer Dictionary (Microsoft Press 2002), pp. 304 and 561.
Excerpts from the Prosecution History of U.S. Appl. No. 10/135,878, filed Apr. 29, 2002.
File History of U.S. Pat. No. 6,636,591, U.S. Appl. No. 09/640,999, filed Aug. 17, 2000.
File History of U.S. Pat. No. 8,135,115, U.S. Appl. No. 11/603,938, filed Nov. 22, 2006.
File History of U.S. Pat. No. 8,190,121, U.S. Appl. No. 12/103,138, filed Apr. 15, 2008.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
File Wrapper of Reexamination U.S. Appl. No. 90/012,802 of U.S. Pat. No. 8,190,121, filed Mar. 1, 2013.
Fleischman, E., "Advanced Streaming Format (ASF) Specification," Microsoft Corporation (Jan. 9, 1998).
Garner, et al., "Mobile Terminated SMS Billing—Exploits and Security Analysis," IEEE International Conference on Information Technology: New Generations, 2006.
Jain, A., "An Introduction to Biometric Recognition," IEEE Transactions on Circuits and Systems for Video Technology, vol. 14, No. 1, Jan. 2004; pp. 4-20.
Jeff Hewett and Lee Dryburgh, Signaling System No. 7 (SS7/C7): Protocol, Architecture, and Services (Networking Technology) at 85 (Cisco Press, Jun. 2005).
Johnson, S., "An Environment for Treating Youthful Offenders," The Robert F. Kennedy Youth Center, Offender Rehabilitation, vol. 2, No. 2, 1977; pp. 159-172.
Joint Application, filed in *In re ASP GTEL Holdco, LLC*, No. 11-184 (Fed. Commc'ns Comm'n Oct. 28, 2011).
Joint Claim Construction and Prehearing Statement, Exhibit B: Securus' Intrinsic and Extrinsic Evidence Charts, *Global Tel*Link Corporation v. Securus Technologies, Inc.*, No. 3:14-cv-00829-K (N.D. Tex.), Sep. 26, 2014.
Kandel et al., "Rapid Educational Rehabilitation for Prison Inmates," Behaviour Research & Therapy, vol. 14, 1976; pp. 323-331.
Karacki et al., "Rewards in an Institution for Youthful Offenders," The Howard Journal of Penology and Crime Prevention, vol. XIII, No. 1, 1970; pp. 20-30.
Kozamernik, F., "Media Streaming over the Internet—an overview of delivery technologies," EBU Technical Review (Oct. 2002).
Liebling, "Incentives and Earned Privileges Revisited: Fairness, Discretion, and the Quality of Prison Life," Journal of Scandanavian Studies in Criminology and Crime Prevention, vol. 9, 2008; pp. 25-41.
McKitterick et al., "State of the Art Review of Mobile Payment Technology," Department of Computer Science, Trinity College Dublin, 2003; 22 pages.
Microsoft Computer Dictionary, Fifth Edition, Microsoft Computer Press: Redmond, WA, 2002.
Newton, H., Newton's Telecom Dictionary (18th ed. 2002); p. 655.
Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Prosecution History of U.S. Appl. No. 11/005,816, filed Dec. 7, 2004.
Prosecution History of U.S. Appl. No. 11/045,589, filed Dec. 12, 2006.
Prosecution History of U.S. Appl. No. 11/562,842, filed Nov. 22, 2006.
Response to Office Action, filed Jan. 6, 2009, in Prosecution History of U.S. Appl. No. 10/642,532, filed Aug. 15, 2003.

(56) References Cited

OTHER PUBLICATIONS

Rey, R.F., ed., "Engineering and Operations in the Bell System," 2nd Edition, AT&T Bell Laboratories: Murray Hill, NJ, 1983.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLink, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Segal, D., "Phoning From Prison, at Prices Through the Roof," The New York Times, Feb. 1, 2014.
Shields, T., "Prison Phones Prove Captive Market for Private Equity," Bloomberg Business, Oct. 4, 2012.
Sundstrom, K., "Voice over IP: An Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 60/377,763, filed May 3, 2002.
U.S. Appl. No. 60/607,447, "IP-based telephony system and method," to Apple, et al., filed Sep. 3, 2004.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.
Valcourt, et al., "Investigating mobile payment: Supporting technologies, methods, and use," IEEE International Conference on Wireless and Mobile Computing, Networking, and Communications, 2005.
Walden, R., "Performance Trends for Analog-to-Digital Converters," IEEE Communications Magazine, Feb. 1999.
Waldon et al., The Industry Analysis Division's Reference Book of Rates, Price Indices, and Household Expenditures for Telephone Service, Mar. 1997; 167 pages.
Wireless Interconnection and Reciprocal Compensation Agreement Between Community Telephone Company and United States Cellular Corporation, Apr. 24, 2006; 29 pages.
Wormith, J.S., "The Development of a Prison Incentive System: A Case Illustration," Proceedings of the First Annual Corrections Research Forum, Ottawa Mar. 1989; pp. 77-93.

* cited by examiner

CALL PROCESSING SYSTEM FOR MODIFYING INMATE COMMUNICATION LIMITS

CROSS-REFERENCE TO RELATED APPLICATIONS

This application is a continuation of U.S. patent application Ser. No. 15/879,026, filed on Jan. 24, 2018, which is a continuation of U.S. patent application Ser. No. 15/639,798 filed on Jun. 30, 2017 (now U.S. Pat. No. 9,912,821), which are incorporated by reference herein in their entirety.

BACKGROUND

Field

The disclosure relates to systems and methods for determining and modifying time limits of inmate communications at correctional facilities.

Background

In a controlled environment, such as a correctional facility, inmates have limited opportunities to interact with the outside world. Correctional facilities provide inmates with the ability to communicate with friends, families, and/or loved ones through telephone calls as it improves recidivism and provides incentives for inmates to follow rules and policies of the facility. In addition to traditional telephone calls from payphones, correctional facilities seek to offer a wide variety of communication services to inmates, such as video calls, video visitations, and phone calls from mobile devices, among others. However, such communications for inmates are often limited by correctional facilities with respect to call lengths and time limits.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
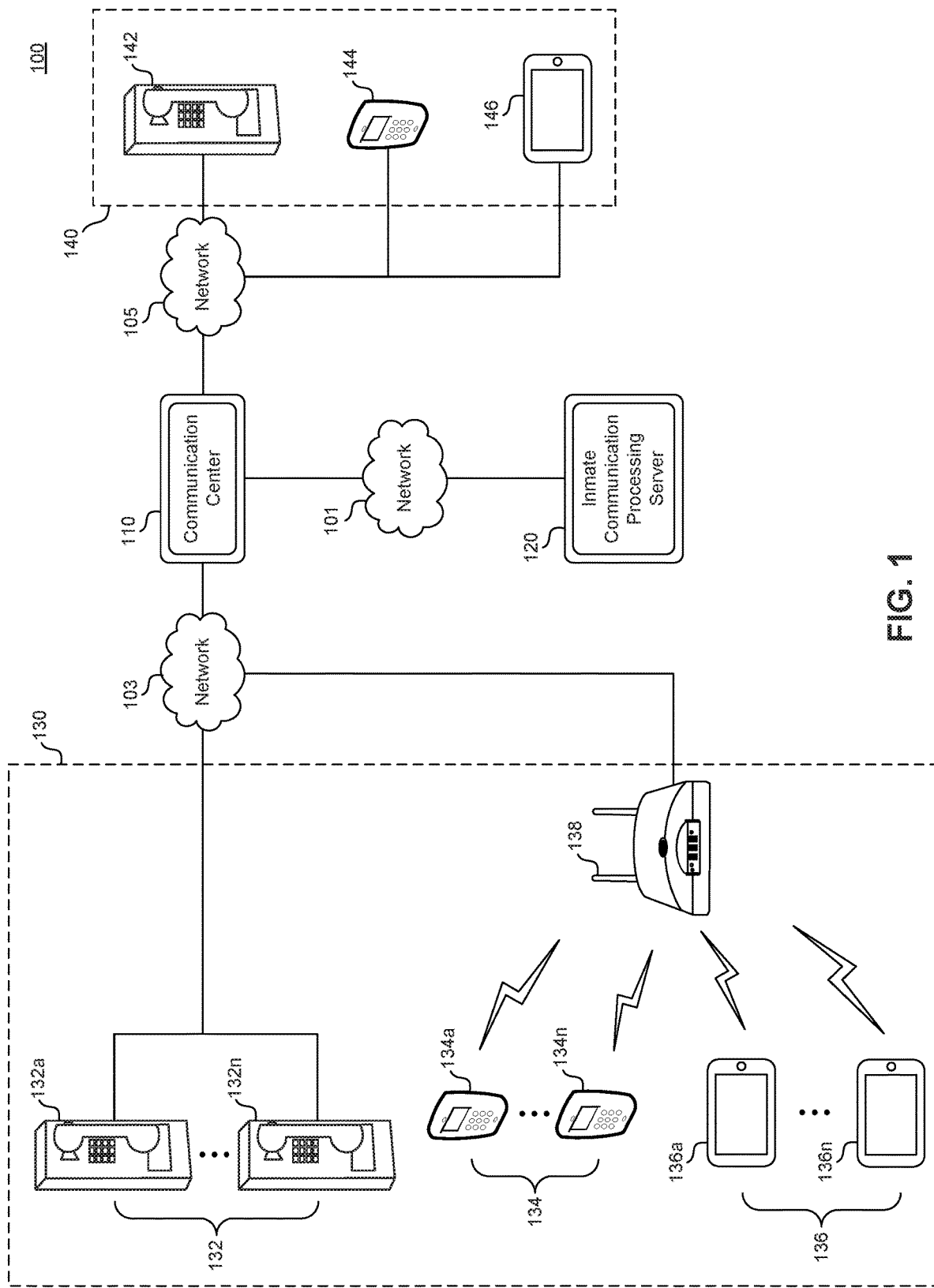
FIG. 1 illustrates a block diagram of an inmate communication processing system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

In inmate communications, correctional facilities impose strict time limits on inmate phone calls as a result of a limited number of payphones and/or landline phones to accommodate thousands of inmates in a correctional facility. For example, correctional facilities impose a time limit of 15 minutes for each inmate phone call because there are not enough payphones and/or landline phones for inmates to use in the correctional facility. In addition, time limits on inmate phone calls can be restricting particularly when an inmate needs to communicate with an individual, such as his or her attorney or a family member, for a call length that is longer than the allotted time limit. For such communications, the inmate may need to redial a called party repeatedly after the time limit of a phone call has transpired in order to communicate with the called party for a time period longer than the time limit. The inmate also has to wait for a certain period of time after a phone call before the inmate is permitted to place another call. With each redial, the inmate incurs additional costs and has to wait for extensive periods of time before another phone call can be placed, which is increasingly expensive and time-consuming for inmates.

Additionally, strict time limits for inmate phone calls might be unnecessary because inmates are not limited only to using the payphones and/or landline phones that are located within the correctional facility. For example, inmates can use personal mobile devices issued by the correctional facility to place phone calls in addition to or alternative to the payphones in the facility. Inmates might not have to share the phones or time permitted for using the phones with other inmates because each inmate may have access to his or her own communication device issued by the facility. On the contrary, inmate phone calls without any time limit or restriction may also be undesirable, resulting in inmates engaging in illicit or disallowed activities during lengthy phone calls. Accordingly, there is a need for new technologies, systems, and methods for determining and customizing time limits for inmate communications in correctional facilities.

Inmate Communication Processing System

FIG. 1 illustrates a block diagram of an inmate communication processing system 100, according to embodiments of the present disclosure. Inmate communication processing system 100 includes an inmate communication processing server 120 configured to receive communication data from a communication center 110. In this disclosure, communication data refers to data collected during real-time communications between two parties, such as voice calls, audio communications, and/or video communications between an inmate in a controlled environment using inmate communication system 130 and an outsider using outsider communication system 140. In some embodiments, communication data includes the communication itself, such as audio of a voice calls, as well as data related to the communication, as will be described in further detail below. The inmate communication processing server 120 connects to the communication center 110 via a network 101. The network 101 includes at least one of a local area network (LAN), wireless area network (WAN), or the Internet.

In some embodiments, the communication center 110 connects the inmate communication system 130 to the outsider communication system 140. For example, the communication center 110 facilitates call routing and/or video conferencing for parties within a correctional facility and outside parties, such as via devices within the inmate communication system 130 and outsider communication system 140. Inmate communication system 130 includes one or more communication devices available to inmates to perform voice calls within a correctional facility and includes any or all devices such as a plurality of telephones 132 (e.g., telephones 132a-132n), a plurality of mobile devices 134 (e.g., mobile devices 134a-134n), and a plurality of wireless communication devices 136 (e.g., wireless communication devices 136a-136n). In an embodiment, the telephones 132 comprise payphones and/or landline phones that are located locally within the correctional facility, such as in a designated area or room of the controlled environment. For example, the telephones 132 utilize analog "plain old telephony service" (POTS) lines or integrated services digital network (ISDN) lines. In another embodiment, the telephones 132 comprise Voice over Internet (VoIP) phones.

Mobile devices 134 and wireless communication devices 136 are also available to inmates to perform real-time communications, such as voice calls, video calls, and/or video conferences. In some embodiments, wireless communication devices 136 comprise at least one of a tablet computer, a laptop computer, or any other computing device capable of viewing a user interface. Real-time communications from mobile devices 134 and wireless communication devices 136 are routed through a wireless access point 138 (e.g., a router), in which the wireless access point 138 provides connectivity to the mobile devices 134 and wireless communication devices 136. In some embodiments, inmates are provided with access to at least one of telephones 132, mobile devices 134, and/or wireless communication devices 136 located within in the correctional facility. The communication center 110 connects to the telephones 132, mobile devices 134, and wireless communication devices 136 in the inmate communication system 130 via a network 103. The network 103 comprises at least one of a LAN, WAN, or the Internet. The communication center 110 also connects to the outsider communication system 140. Outsider communication system 140 includes one or more communication devices available to outsiders or individuals external to the correctional facility and/or outside of the inmate communication system 130. For example, outsiders include at least one of attorneys, family members, friends, loved ones, or inmates located in another correctional facility that is different from the correctional facility of inmate communication system 130. Outsider communication system 140 includes communication devices, such as a telephone 142, mobile device 144, and/or a wireless communication device 146.

Although only one telephone 142, one mobile device 144, and one wireless communication device 146 is shown in FIG. 1, it is understood that there can be any number of components 142, 144, and 146 in the outsider communication system 140. The communication center 110 connects to the outsider communication system 140 via a network 105, in which the network 105 comprises at least one of a WAN, the Internet, and the Public Switched Telephone Network (PSTN). In an embodiment, the WAN facilitates communications with an outsider communication system 140 in other nearby prisons, such as correctional facilities within the same county, state, jurisdiction, or the like. For example, telephones 142, mobile devices 144 and/or wireless communication devices 146 located at other correctional facilities provide cross-facility visitations between inmates. In another embodiment, the PSTN is used to provide connectivity to the telephones 142, mobile devices 144, and wireless communication devices 146 over traditional data networks.

Inmate Communication Processing Server

Figure 2:
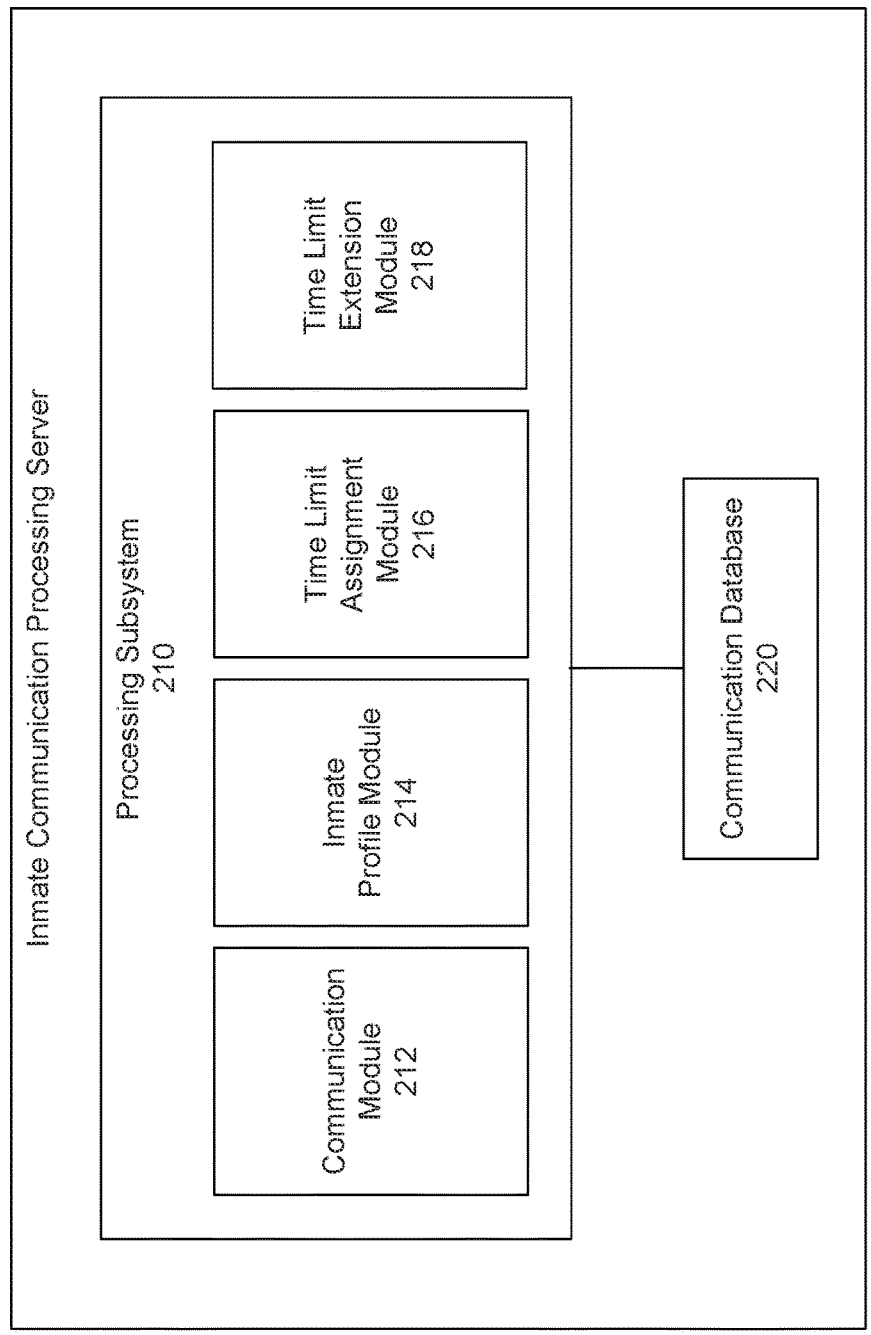
FIG. 2 illustrates a block diagram of an inmate communication processing server in the inmate call processing system, according to embodiments of the present disclosure.

FIG. 2 illustrates a block diagram of the inmate communication processing server 200, according to embodiments of the present disclosure. Inmate communication processing server 200 represents an exemplary embodiment of inmate communication processing server 120 in FIG. 1. Inmate communication processing server 200 includes at least one of a processing subsystem 210 and a communication database 220, as shown in FIG. 2. In some embodiments, processing subsystem 210 includes one or more processors, computers, or servers identified as modules and is constructed as individual physical hardware devices, or as virtual devices, such as a virtual server.

In some embodiments, processing subsystem 210 functions as the primary logic processing center in inmate communication processing server 200. Processing subsystem 210 manages and facilitates overall communication between modules and database(s) of inmate communication processing server 200 and devices and/or systems external to inmate communication processing server 200, such as telephones 132, mobile devices 134, wireless communication devices 136, outsider communication system 140, and/or communication center 110. Processing subsystem 210 includes communication module 212, inmate profile module 214, time limit assignment module 216, and time limit extension module 218.

Communication module 212 obtains and manages data for inmate communications in the correctional facility. Communication module 212 facilitates monitoring, processing, and/or recording of audio and/or video collected during voice calls and video calls between an inmate in a controlled environment using inmate communication system 130 and an outsider using outsider communication system 140. In some embodiments, communication module 212 receives communication data, such as audio or video for each communication, from the communication center 110. In some embodiments, communication module 212 receives communication data for a plurality of inmate communications concurrently for a plurality of inmates at the correctional facility. In addition to receiving the communication data, communication module 212 is also configured to perform format conversion, decryption, and/or encryption of communication data received from the communication center 110.

Different audio and video devices that participate in communications employ a variety of unique communication standards. Communication module 212 performs conversion of communications received from the communication center 110 to different formats in order to extract and/or identify metadata from the communication data. In some embodiments, metadata comprises data associated with the communication data, which includes at least one of a date and time of the communication, identities of parties on the communication, a type of encoding (e.g., audio or video compression and decompression), a rate of encoding (e.g., bit rate), a location of devices utilized during the communication, which device(s) are being used for the communication (e.g., telephone 132, mobile device 134, or wireless communication device 136), and other attributes or characteristics of the communication.

For example, communication module 212 receives audio data from communication center 110 and determines that the type of communication device used for the communication is a telephone 132. In another example, communication module 212 receives audio data from communication center 110 and determines that the type of communication device used for the communication is a mobile device 134. In yet another example, communication module 212 receives video data from communication center 110 and determines that the type of communication device used for the communication is a mobile device 134 or a wireless communication device 136. Communication module 212 logs/and or stores this data corresponding to the type of communication device in the communication module 212 and/or the communication database 220, and other modules in the processing subsystem 210 (e.g., inmate profile module 214, time limit assignment module 216, and/or time limit extension module 218) are provided with access to this stored data. In some embodiments, data corresponding to an inmate communication includes at least one of audio data/video data collected during a communication (e.g., an audio call, voice call, video conference, etc.) and metadata of the inmate communication.

In additional embodiments, communication module 212 performs voice recognition and/or image recognition on video and/or audio received from the communication center 110 to verify the identity of an inmate and/or the identity of an outsider as the call recipient in a communication. Communication module 212 utilizes one or more speech recognition, voice biometrics, and/or image processing algorithms to identify an inmate or call recipient and determine whether audio and/or images of an inmate's or call recipient's voice or image in a communication match reference audio and/or reference images of the inmate's or call recipient's voice or image. For example, reference audio and/or reference images of the inmate's or call recipient's voice or image are extracted and compiled from previous inmate communications and stored in the communication module 212 and/or the communication database 220. If the audio or images of the inmate's or call recipient's voice or image do not match, the communication module 212 may communicate with processing subsystem 210 to suspend the communication between the inmate and the called party. In some embodiments, communication module 212 transmits data regarding the identity of the call recipient in an inmate communication to at least one of inmate profile module 214, time limit assignment module 216, and/or time limit extension module 218.

Inmate profile module 214 obtains and stores profile information, behavioral history, and inmate calling information for each inmate in the correctional facility. In some embodiments, inmate profile module 214 obtains profile information related to the inmates from one or more of (a) a jail management system (JMS) or an offender management system (OMS) operated by the jurisdiction of the correctional facility, (b) public database containing information on the inmates, or (c) a questionnaire provided by a web page, a personal approved number (PAN) list, or booking information. In some embodiments, profile information obtained by inmate profile module 214 includes personal information for each inmate, such as names, previous residences or correctional facilities, authorized contacts (e.g., including a name, identity, phone number, and the like for each authorized contact), family members, and languages.

Inmate profile module 214 also collects a behavioral history for each inmate, in which the behavioral history includes information regarding a plurality of behaviors of an inmate at the correctional facility during his or her sentence. In some embodiments, the plurality of behaviors of the inmate include at least one of good behaviors or conduct, such as the inmate following the rules and policies of the correctional facility and jurisdiction, and bad behaviors or conduct, such as the inmate disregarding the rules and policies of the correctional facility and jurisdiction. For example, good behaviors for an inmate include the inmate following the rules and policies and also avoiding one or more prohibited activities in the correctional facility that are predetermined by the jurisdiction. In another example, bad conduct behaviors include the inmate engaging in prohibited activities or infractions within the correctional facility, such as altercations with other inmates and/or infractions related to telephone behavior.

In some embodiments, inmates are rated on a numerical scale for their behaviors by one or more employees of the correctional facility or by the jurisdiction. For example, inmates are rated on a scale from 1 to 10, in which 1 indicates a "poor" rating, 10 indicates a "good" rating, and 2-9 indicate rating levels in between. Inmates who exhibit good or exceptional behaviors at the correctional facility are rated a 10, whereas inmates who exhibit bad or negative behaviors at the correctional facility are rated a 1. Inmate profile module 214 compiles and stores the values of one or more ratings of the inmate's behaviors in an inmate profile for each inmate. In other embodiments, inmates are awarded good behavior credits for performing certain behaviors and/or for avoiding infractions within the correctional facility. In such cases, inmate profile module 214 compiles and stores the number of good behavior credits in an inmate profile for each inmate. The good behavior values or credit information is stored in the inmate profile module 214 and/or in the communication database 220.

In additional embodiments, the inmate profile module 214 also obtains booking information or case information for each inmate, such as names, addresses, and contact information (e.g., phone numbers) of one or more attorneys, judges, witnesses, or other individuals pertinent to an inmate's case. Based on this information, the inmate profile module 214 is configured to compile a list of approved contacts that the inmate is allowed to contact and/or a list of contacts that the inmate is restricted from contacting. The list of approved contacts and the list of restricted contacts include names, identities, and phone numbers for each listed contact. In some embodiments, the list of approved contacts also includes values of time limits that have been allotted for inmate communications with certain approved contacts. For example, the list of approved contacts may include an inmate's family member and the inmate's attorney. In some cases, the inmate is permitted 20 minutes, 30 minutes, or another period of time to communicate with the family member and 45 minutes, 60 minutes, or another period of time to communicate with the attorney, or vice versa. The time limits permitted for communications with different call recipients are determined and assigned by the time limit assignment module 216, as will be described in further detail below, and the time limits are included in the list of approved contacts.

Inmate profile module 214 also collects and manages inmate calling information, such as a calling history for each inmate, including at least one of previously dialed phone numbers, identities of individuals called in a phone call or a video conference/call, dates, times and durations of each audio call or video call of each inmate, and the like. In some embodiments, the inmate profile module 214 compiles the calling history for each inmate from data received from the communication module 212. For example, the calling history for each inmate includes information for communications received from the communication module 212 over a predetermined period of time, such as 30 days, one month, 6 months, one year, or any other period of time during each inmate's sentence at the correctional facility. Inmate calling histories, list of approved contacts, and lists of restricted contacts for each inmate are stored in the inmate profile module 214, communication module 212, and/or the communication database 220 and may be accessed by the time limit assignment module 216 and/or the time limit extension module 218.

Time limit assignment module 216 determines and assigns time limits for inmate communications at the correctional facility. In particular, time limit assignment module 216 is configured to determine time limits based on data obtained from the communication module 212 and inmate profile module 214. In some embodiments, time limit assignment module 216 interfaces with the communication module 212 to identify a type of communication device utilized by an inmate during an inmate communication, as well as whether the inmate communication is an audio call or a video call. For example, time limit assignment module 216 receives data from the communication module 212 indicating that the inmate is participating in an audio call or a video call and using at least one of a payphone or landline such as telephone 132, a smartphone or mobile device such as mobile device 134, a tablet computer such as wireless communication device 146, or the like.

In some cases, time limit assignment module 216 determines different time limits for an inmate communication based on the type of communication device that the inmate is utilizing and/or the type of communication in which the inmate is participating. For example, if the time limit assignment module 216 identifies that the inmate is communicating in an audio or voice call on a payphone, the time limit assignment module 216 determines a first value for the time limit of the inmate communication. If the time limit assignment module 216 identifies that the inmate is communicating in a video call on a tablet computer, the time limit assignment module 216 determines a second value for the time limit of the inmate communication. In this example, the second value for the time limit of the inmate communication is greater than the second value for the time limit of the inmate communication. The time limit values for the different communications and varying communication devices may be decided upon by the correctional facility in order to accommodate for communication bandwidth and the number of inmates at the correctional facility.

In additional embodiments, time limit assignment module 216 determines various time limits for an inmate communication based on an amount of funds available to an inmate for phone calls, video calls, or the like. For example, each inmate has an account (e.g., a calling account) with funds for inmate communications at the correctional facility. Funds are deposited into the inmate's account prior to inmate communications in order for the inmate to pay for phone calls, video calls, or other communications on an inmate communication device (e.g., telephone 132, mobile device 134, or wireless communication device 136). In some embodiments, time limit assignment module 216 retrieves account information for an inmate from inmate profile module 214. For example, account information for a plurality of inmates, includes one or more of inmate names, inmate identification numbers, correctional facility names and locations, names of financial institutions, account numbers and routing numbers for financial institutions of inmates, credit card numbers, debit card numbers, account balances, or the like. Time limit assignment module 216 identifies the amount of funds available in the inmate's account based on the inmate's account information (e.g., during an inmate communication) and determines a time limit value for an ongoing inmate communication based on how much time the inmate can afford to pay for a phone call, audio call, or video call from the remaining funds in the inmate's account.

Furthermore, time limit assignment module 216 also determines different time limits for inmate communications based on the call recipient of each inmate communication. In some embodiments, time limit assignment module 216 interfaces with communication module 212 and inmate profile module 214 to obtain data regarding the identity of a called party in an inmate communication. Time limit assignment module 216 receives data verifying the call recipient of an inmate communication from communication module 212 and then retrieves an inmate profile of the inmate from the inmate profile module 214 or the communication database 220. The inmate profile includes the inmate's behavioral history, calling history, and a list of approved contacts with whom the inmate is allowed to communicate. In some embodiments, time limit assignment module 216 is configured to determine if the call recipient of the inmate communication is on the list of approved contacts by matching a name and/or phone number of the call recipient with an entry in the list. If the call recipient is not included in the list, time limit assignment module 216 communicates with processing subsystem 210 to suspend the communication between the inmate and the call recipient.

If the call recipient is included in an entry in the list of approved contacts, then time limit assignment module 216 identifies a time limit value permitted for the inmate's communication with the call recipient, in which the time limit value is also included in the entry. For example, the time limit value in the entry for the call recipient may already have been assigned prior to the inmate's communications with the call recipient and may be based on the type of inmate communication and the type of communication device that the inmate is utilizing. In some embodiments, the time limit assignment module 216 determines time limit values for call recipients by accessing inmate calling history, such as identities of individuals called and times and durations of previous video calls and audio calls of inmates, from the inmate profile module 214, in order to determine the durations of previous communications with certain call recipients and assign a time limit for communications with such call recipients accordingly. For example, if an inmate has a calling history of communicating with a loved one or attorney for about 30-45 minutes (or another period of time) during phone calls over the past 30 days, 2 months, 6 months or longer, then the time limit assignment module 216 assigns a time limit value of 45 minutes for the inmate's audio communications with the loved one or attorney. In some cases, time limit assignment module 216 employs Bayesian statistics or algorithms, machine learning algorithms, deep learning algorithms, or the like to identify patterns in the inmate's calling history and compute time limit values accordingly.

In additional embodiments, time limit assignment module 216 utilizes the inmate's behavioral history to determine and assign time limit values to inmate communications. For example, time limit assignment module 216 parses data of an inmate profile to obtain values of one or more ratings of an inmate's behaviors at the correctional facility. For example, the inmate is scored or given ratings on a numerical scale according to his or her behaviors at the correctional facility, including following and/or disregarding rules and policies of the correctional facility and engaging in infractions, or the like. In some embodiments, time limit assignment module 216 determines time limit values for inmate communications corresponding to the values of the one or more ratings of the inmate's behavior. For example, time limit assignment module 216 assigns a first time limit to a first inmate with a behavior rating of "1" (e.g., on a scale of 1 to 10 with 1 indicating "poor" behavior) and a second time limit to a second inmate with a behavior rating of "10" (indicating "good" behavior), in which the value of the first time limit is longer than the value of the second time limit.

In some embodiments, time limit assignment module 216 identifies whether at least one value of the one or more ratings of the inmate's behaviors is above or below a predefined threshold. Time limit assignment module 216 utilizes the predefined threshold to assess whether one or more ratings of the inmate's behaviors meet a mandatory score or rating level to obtain a time limit of a certain value. For example, using a scale of 1 to 10, time limit assignment module 216 identifies whether the inmate's behavior ratings are equal to or above a 6 in order to assign a time limit of 1 hour for inmate communications. In another example, if the inmate's behavior ratings are below a 5, time limit assignment module 216 assigns a time limit of 30 minutes for the inmate's communications. In some embodiments, time limit assignment module 216 updates or adds additional time to an allotted time limit based on the one or more ratings of the inmate's behaviors. By allowing time limits for inmate communications to be customized based on inmate behaviors, the inmate communication processing server rewards inmates with good behaviors with longer time limits for communication with family members, friends, and loved ones than the time limits assigned to inmates with bad behaviors. Communication time limits based on inmate behaviors provides a further incentive for inmates to follow the rules and policies of a correctional facility and avoid engaging in infractions or prohibited activities.

In some embodiments, time limit assignment module 216 assigns time limits to inmates by associating particular time limits with inmates in a plurality of records stored within the time limit assignment module 216 and/or the communication database 220. After time limits have been determined and assigned by time limit assignment module 216, the processing subsystem 210 applies each time limit value to inmate communications with various call recipients. In some embodiments, time limit assignment module 216 performs time limit assignment for inmate communications in or near real-time (e.g., as the phone calls or video calls are occurring), whereas in other embodiments, time limit assignment module 216 determines time limits for an inmate prior to the initiation of communication with a call recipient.

In some embodiments, processing subsystem 210 applies time limits to inmate communications in or near real-time (e.g., as the phone calls or video calls are occurring). For example, processing subsystem 210 applies a time limit to an inmate communication by suspending the inmate communication after the duration of the inmate communication has reached the time limit. For example, time limit assignment module 216 determines and assigns a time limit for an inmate's call with a family member to be a certain period of time, such as one hour. After the call has reached one hour, the processing subsystem 210 suspends or disconnects the inmate's call with the family member.

Time limit extension module 218 determines and assigns extensions for time limits of inmate communications at the correctional facility. In particular, time limit extension module 218 communicates with inmate profile module 214 and time limit assignment module 216 to identify a time limit that has been assigned for a particular inmate communication and generate one or more alerts regarding the time limit. In some embodiments, time limit extension module 218 generates one or more alerts to transmit to an inmate communication device (e.g., telephone 132, mobile device 134, or wireless communication device 136), in which the one or more alerts indicate the time limit assigned to the inmate communication. In additional or alternative embodiments, time limit extension module 218 generates one or more alerts to transmit to the inmate communication device after determining that a remaining time in the inmate communication is equal to or less than a predetermined period of time. For example, time limit extension module 218 determines that 10 seconds, 30 seconds, 1 minute, 5 minutes, 10 minutes, or another predetermined period of time remains in the inmate communication, and time limit extension module 218 transmits one or more alerts to an inmate communication device to notify the inmate of the remaining length of time in the inmate communication.

In some embodiments, the one or more alerts transmitted from the time limit extension module 218 to the inmate communication device include one or more options for the inmate to extend the time limit of his or her communication. For example, inmates can request to extend communication time limits via their inmate communication devices, and time limit extension module 218 determines whether each inmate is approved or eligible for a time limit extension. In some embodiments, in response to a request, time limit extension module 218 determines whether an inmate is approved or eligible for a time limit extension by obtaining information from the inmate profile module 214 and/or communication database 220, such as inmate profile information, behavioral history, calling history, and/or other information predetermined by the correctional facility or jurisdiction.

In some embodiments, time limit extension module 218 determines whether the inmate is eligible to extend the time limit during communications with a particular call recipient. For example, the inmate may be allowed to extend communications with his or her attorney up to several hours (e.g., 2 hours, 5 hours, etc.) or an unlimited period of time, whereas the inmate is permitted to extend communications with a family member or friend by merely 30 minutes, 45 minutes, or the like. Such time extension information and policies for extending time limits may be set or input by one or more employees, prison security personnel, or other administrators of the correctional facility, and the time extension policies are applied by the time limit extension module 218.

If an inmate is eligible or approved for time extensions, time limit extension module 218 determines if a specific time extension has been requested and whether an inmate is approved for that specific time extension. For example, the inmate may request to extend a call with his or her family member by 1 hour, but the inmate has only been approved for a 45-minute time extension. In such cases, time limit extension module 218 may have to decline the inmate's request for a specific time extension and assign a predetermined extension to the communication instead. In some embodiments, time limit extension module 218 adds time to the time limit of an inmate communication based on good behaviors of the inmate. For example, if at least one value of one or more ratings of the inmate's behaviors is above a predefined threshold, time limit extension module 218 extends the inmate's time limit for the inmate communication by an additional 15 minutes, 30 minutes, 45 minutes, 1 hour, or another predetermined period of time.

In some embodiments, processing subsystem 210 applies time limit extensions to inmate communications in or near real-time (e.g., as the phone calls or video calls are occurring). For example, processing subsystem 210 applies a time limit extension to an inmate communication by adding a time period to the time limit of the inmate communication during the inmate communication. For example, time limit extension module 218 determines that an inmate is eligible or approved for a time extension and extends the time limit of an inmate communication with a family member by a certain period of time. After the call has reached the end of the time limit extension, the processing subsystem 210 suspends or disconnects the inmate's call with the family member.

In additional or alternative embodiments, processing subsystem 210 is configured to turn off or deactivate the time limit feature for inmate communications. For example, correctional facilities may wish to allow inmates to be able to speak on the phone (e.g., telephone 132 and/or mobile device 134) and/or video chat (e.g., mobile device 134 and/or wireless communication device 136) with family members, friends, attorneys, or the like for unlimited periods of time without any time limits. Administrators of a correctional facility (e.g., one or more employees or personnel of the correctional facility or jurisdiction) may specify such preferences for inmate communications by providing instructions to deactivate time limits to the inmate communication processing server 200 via one or more computing devices. For example, processing subsystem 210 of the inmate communication processing server 200 receives the instructions to deactivate time limits from computing devices associated with the administrators of the correctional facility. Based on the instructions, processing subsystem 210 communicates with time limit assignment module 216 to deactivate time limits for inmate communications by transmitting a "stop" command to time limit assignment module 216. The "stop" command disables the operations of the time limit assignment module 216 and causes the time limit assignment module 216 to turn off, deactivate, and/or prevent time limits from being assigned to inmate communications.

In additional or alternative embodiments, processing subsystem 210 is configured to turn off or deactivate the time limit extension feature for inmate communications. For example, correctional facilities may wish to prevent extensions of inmate communication time limits. In another example, correctional facilities may have already deactivated the time limit feature for inmate communications and might not need the time limit extension feature to be applied for calls with unlimited time periods. In order to deactivate the time limit extension feature, administrators of the correctional facility may specify such preferences for inmate communications by providing instructions to deactivate time limit extensions to the inmate communication processing server 200 via one or more computing devices. For example, processing subsystem 210 of the inmate communication processing server 200 receives the instructions to deactivate time limit extensions from computing devices associated with the administrators of the correctional facility. Based on the instructions, processing subsystem 210 communicates with time limit extension module 218 to deactivate time limit extensions for inmate communications by transmitting a "stop" command to time limit extension module 218. The "stop" command disables the operations of the time limit extension module 218 and causes the time limit extension module 218 to turn off, deactivate, and/or prevent time limit extensions from being assigned to inmate communications.

Communication database 220 comprises any number of databases and/or servers, and stores and organizes data in one or more relational databases. Communication database 220 runs a database management system, such as MYSQL™, to provide an example. In some embodiments, communication database 220 includes organized data, such as inmate profile data, inmate behavior data and ratings, predefined threshold values, calling history data, audio data, video data, assigned time limits, assigned time extensions, predetermined lengths of time for extensions, and settings that are indexed and linked to allow access to data for processing subsystem 210, communication module 212, inmate profile module 214, time limit assignment module 216, and/or time limit extension module 218.

Inmate Communication Device

Figure 3:
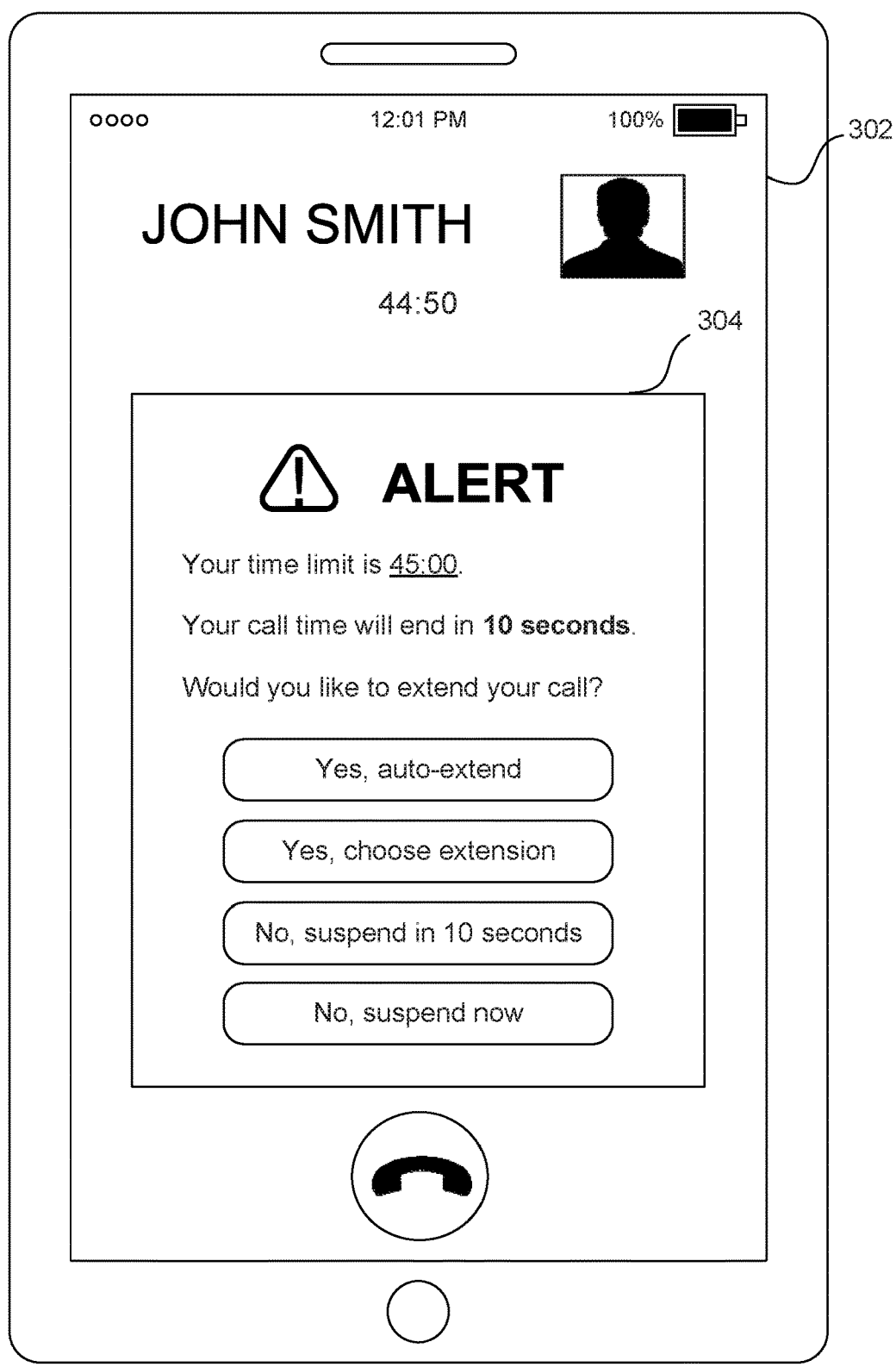
FIG. 3 illustrates a diagram of an inmate communication device, according to embodiments of the present disclosure.

FIG. 3 illustrates a diagram of an inmate communication device 300, according to embodiments of the present disclosure. In some embodiments, the inmate communication device 300 represents an exemplary embodiment of mobile device 134 or communication device 136 in FIG. 1. The inmate communication device 300 comprises a display 302 which illustrates an example user interface during an inmate communication between an inmate and a called party. The user interface of display 302 presents the inmate with information regarding an ongoing communication, such as an audio call or a video call. For example, the user interface shows the identity of a called party (e.g., a picture, a first name, and last name of the called party) and a call time indicating the current duration of the call.

The user interface also includes an alert 304. The alert 304 comprises a notification regarding the time limit of the call and time limit extension options. For example, the inmate is assigned a time limit of 45 minutes (e.g., by the inmate communication processing server 200), and the alert 304 notifies the inmate of the assigned time limit and a length of time remaining in the call. The alert 304 also provides the inmate with different options from which the inmate may choose during the call. For example, the alert 304 includes two options for extending the time limit of the inmate call, such as a first option for "Auto-extend" in which the inmate can request to extend the time limit automatically and a second option for "Choose extension" in which the inmate can choose the amount of time by which to extend the inmate call. By selecting the "Auto-extend" option, the inmate's call is automatically extended by a predetermined length of time, which is determined by the inmate communication processing server 200. For example, the inmate's call is extended by 5 minutes, 10 minutes, 20 minutes, or another predetermined length of time.

The "Choose extension" option allows the inmate to decide upon a specific length of time by which the inmate desires to extend the call. The inmate provides user input to request an extension time including the specific length of time through the display 302 of the inmate communication device 300. In some cases, the inmate communication processing server 200 receives the request for the extension time from the inmate communication device 300 and determines if the inmate is eligible or qualified for the extension time. If the inmate is eligible or qualified for the extension time, the specific length of time is applied to the call, and the inmate is notified of the extension through the display 302 of the inmate communication device 300.

In other embodiments, the inmate is satisfied with the current duration of the call and might not be interested in extending the call. Thus, the inmate can choose an option to "Suspend in 10 seconds" which allows the inmate to suspend the call after the allotted time has expired, which in this example, is in 10 seconds. Alternatively, the inmate can choose another option to "Suspend now" which allows the inmate to end the call at the present time. By providing inmates with a variety of options for extending time limits, the inmate communication processing system customizes and improves inmate communications with called parties in an efficient manner.

System Operation

Operations of determining time limits of inmate communications and provided time limit extensions to inmates in a correctional facility through inmate communication processing system 100 will be described with respect to FIGS. 4 and 5. Although the physical devices and components that form the system have largely already been described, additional details regarding their more nuanced operation will be described below with respect to FIGS. 1-3. While FIGS. 4 and 5 contain methods of operation of determining and extending time limits for inmate communications through the inmate communication processing system 100, the operations are not limited to the order described below, and various operations can be performed in a different order. Further, two or more operations of each method can be performed simultaneously with each other.

Figure 4:
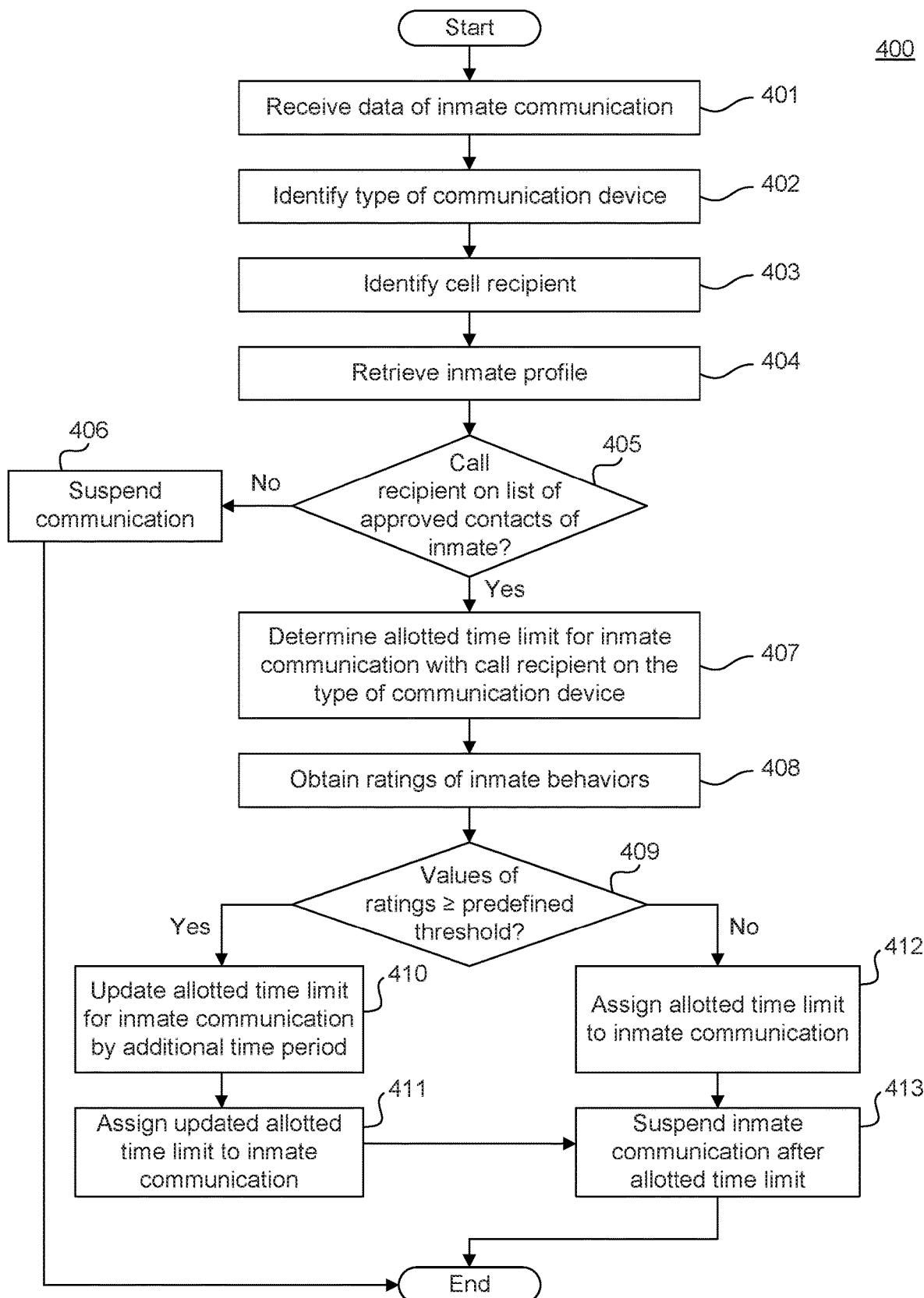
FIG. 4 illustrates a flowchart diagram of a method for determining and assigning time limits to inmate communications, according to embodiments of the present disclosure.

FIG. 4 illustrates a flowchart diagram of a method 400 of determining and assigning time limits to inmate communications, via an inmate communication processing server, such as inmate communication processing server 200 of FIG. 2, according to embodiments of the present disclosure. The steps of method 400 are performed by subsystems and modules of inmate call processing server 200, such as communication module 212, inmate profile module 214, time limit assignment module 216, and/or time limit extension module 218. Method 400 of FIG. 4 begins with step 401 of receiving data of an inmate communication. For example, inmate call processing server 200 receives data corresponding to an inmate communication of an inmate from communication center 110. In some embodiments, inmate call processing server 200 receives communication data for a plurality of inmate communications concurrently from communication center 110, wherein communication data for each inmate is analyzed for determining and assigning time limits.

At step 402, the inmate call processing server identifies the type of communication device of the inmate. For example, inmate call processing server 200 identifies the type of communication device that the inmate is using during the inmate communication based on the received data corresponding to the inmate communication. In some embodiments, the communication module 212 of the inmate call processing server 200 identifies the type of communication device to be a telephone 132, mobile device 134, or wireless communication device 136 based on at least one of the type of communication data received and the metadata. At step 403, the inmate call processing server identifies the call recipient. For example, the communication module 212 of the inmate call processing server 200 identifies the call recipient in the inmate communication based on the data corresponding to the inmate communication, such as the audio data, video data, and/or metadata. In some embodiments, the communication module 212 utilizes voice recognition and/or image recognition to determine and/or verify the identity of the call recipient of the inmate communication.

At step 404, inmate call processing server retrieves an inmate profile of the inmate. For example, inmate call processing server 200 retrieves the inmate profile of the inmate from the inmate profile module 214, in which the inmate profile module 214 is configured to store profiles for a plurality of inmates. At step 405, inmate call processing server determines whether the call recipient is included on a list of approved contacts of the inmate. For example, the time limit assignment module 216 of the inmate call processing server 200 determines if the call recipient of the inmate communication is on the list of approved contacts by parsing the list for an entry with identity information (e.g., a name and/or phone number) that matches the call recipient's name and/or phone number.

If the name and/or phone number of the call recipient does not match the identity information of an approved contact on the list, then method 400 in this example proceeds to step 406. At step 406, inmate call processing server suspends the inmate communication. For example, the processing subsystem 210 of the inmate call processing server 200 suspends or stops the communication between an inmate communication device (e.g., telephone 132, mobile device 134, or wireless communication device 136) and an outsider communication device (e.g., telephone 142, mobile device 144, or wireless communication device 146). If the name and/or phone number of the call recipient matches the identity information of an approved contact on the list, then method 400 in this example proceeds to step 407. At step 407, inmate call processing server determines an allotted time limit for the inmate communication with the call recipient based on the type of communication device. For example, the time limit assignment module 216 of the inmate call processing server 200 utilizes the list of approved contacts from the inmate profile module 214 to identify values of time limits that have been allotted for inmate communications with certain approved contacts. In some cases, the inmate is permitted 20 minutes, 30 minutes, 45 minutes, or another period of time to communicate with a family member and 45 minutes, 60 minutes, 2 hours, or another period of time to communicate with an attorney, or vice versa.

At step 408, inmate call processing server obtains ratings of an inmate's behaviors at the correctional facility. For example, time limit assignment module 216 parses data of an inmate profile from the inmate profile module 214 to obtain values of one or more ratings of an inmate's behaviors at the correctional facility. At step 409, inmate call processing server identifies whether at least one value of the one or more ratings of the inmate's behaviors is above or equal to a predefined threshold. For example, time limit assignment module 216 determines whether at least one value of the one or more ratings of the inmate's behaviors is above or equal to a predefined threshold in order to identify whether an inmate is adhering to rules and policies of the correctional facility. If at least one value of the one or more ratings of the inmate's behaviors is above or equal to the predefined threshold, then method 400 in this example proceeds to step 410.

At step 410, inmate call processing server updates the allotted time limit for the inmate communication by an additional time period. For example, time limit assignment module 216 updates or adds an additional time period to the allotted time limit for inmate communication, in which the additional time period corresponds to the values of the one or more ratings of the inmate's behaviors. At step 411, inmate call processing server assigns the updated allotted time limit to the inmate communication. For example, time limit assignment module 216 assigns the updated allotted time limit to the inmate communication by associating the time limit value with the inmate in one or more records stored within the time limit assignment module 216 and/or the communication database 220. At step 413, inmate call processing server suspends the inmate communication after the allotted time limit. For example, the processing subsystem 210 applies the updated allotted time limit to the inmate communication in or near real-time, and the processing subsystem 210 also suspends the inmate communication after the updated allotted time has expired.

If at least one value of the one or more ratings of the inmate's behaviors is below the predefined threshold, then method 400 in this example proceeds to step 412. At step 412, inmate call processing server assigns the allotted time limit to the inmate communication. For example, time limit assignment module 216 assigns the allotted time limit determined in step 407 to the inmate communication without updating the time limit to account for the inmate's behaviors. Time limit assignment module 216 assigns the allotted time limit to the inmate communication by associating the time limit value with the inmate in one or more records stored within the time limit assignment module 216 and/or the communication database 220. At step 413, inmate call processing server suspends the inmate communication after the allotted time limit. For example, the processing subsystem 210 applies the allotted time limit to the inmate communication in or near real-time, and the processing subsystem 210 also suspends the inmate communication after the allotted time has expired.

Figure 5:
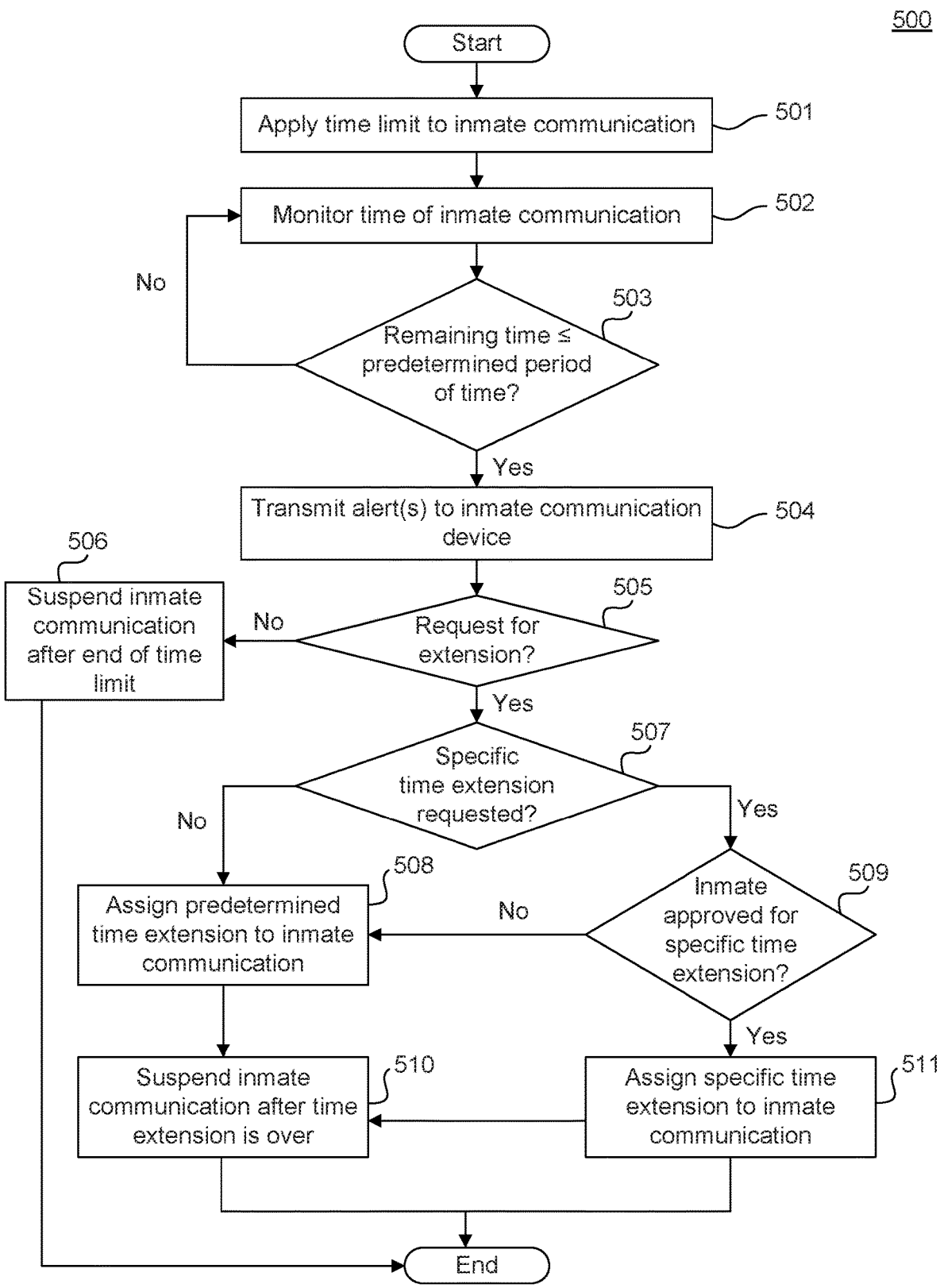
FIG. 5 illustrates a flowchart diagram of a method for extending time limits of inmate communications, according to embodiments of the present disclosure.

FIG. 5 illustrates a flowchart diagram of a method 500 of extending time limits of inmate communications, via an inmate communication processing server, such as inmate communication processing server 200 of FIG. 2, according to embodiments of the present disclosure. The steps of method 500 are performed by subsystems and modules of inmate call processing server 200, such as communication module 212, inmate profile module 214, time limit assignment module 216, and/or time limit extension module 218. Method 500 of FIG. 5 begins with step 501 applying a time limit to an inmate communication. For example, time limit assignment module 216 and processing subsystem 210 of inmate call processing server 200 assigns and applies a time limit to inmate communication following steps 401-412 in method 400 of FIG. 4.

At step 502, the inmate call processing server monitors the time of the inmate communication. For example, time limit extension module 218 of the inmate call processing server 200 identifies the time limit assigned to the inmate communication and monitors the communication with respect to time. At step 503, the inmate call processing server determines whether the remaining time in the inmate communication is less than or equal to a predetermined period of time. For example, time limit extension module 218 determines whether the remaining time in the inmate communication is less than or equal to 10 seconds, 30 seconds, 1 minute, 5 minutes, 10 minutes, or another predetermined period of time. If the remaining time in the inmate communication is greater than the predetermined period of time, then method 500 in this example proceeds to step 502, at which the time limit extension module 218 continues monitoring the time of the inmate communication until the remaining time in the inmate communication is less than or equal to the predetermined period of time.

If the remaining time in the inmate communication is less than or equal to the predetermined period of time, then method 500 in this example proceeds to step 504. At step 504, the inmate call processing server transmits one or more alerts to an inmate communication device. For example, time limit extension module 218 generates and transmits one or more alerts to an inmate communication device (e.g., telephone 132, mobile device 134, or wireless communication device 136), in which the one or more alerts indicate the time limit assigned to the inmate communication, the remaining length of time in the inmate communication, and/or options to extend the time limit.

At step 505, the inmate call processing server determines whether a request for an extension has been received from the inmate communication device. For example, time limit extension module 218 determines whether the inmate call processing server 200 has received, from the inmate communication device, a request to extend the time limit of the inmate communication in response to the one or more alerts. If a request for an extension has not been received from the inmate communication device, then method 500 in this example proceeds to step 506. At step 506, the inmate call processing server suspends the inmate communication after the end of the time limit. For example, the processing subsystem 210 of the inmate call processing server 200 suspends or stops the communication between an inmate communication device (e.g., telephone 132, mobile device 134, or wireless communication device 136) and an outsider communication device (e.g., telephone 142, mobile device 144, or wireless communication device 146) after the time limit has expired.

If a request for an extension has been received from the inmate communication device, then method 500 in this example proceeds to step 507. At step 507, the inmate call processing server determines whether a specific time extension has been requested. For example, time limit extension module 218 determines whether the inmate call processing server 200 has received, from the inmate communication device, a request to extend the time limit of the inmate communication by a specific length of time, such as 20 minutes, 30 minutes, 60 minutes, or the like. If a request for a specific time extension has not been requested, then method 500 in this example proceeds to step 508. At step 508, the inmate call processing server assigns a predetermined time extension to the inmate communication. For example, time limit extension module 218 assigns a predetermined time extension to the time limit of the inmate communication. At step 510, the inmate call processing server suspends the inmate communication after the time extension is over. For example, the processing subsystem 210 applies the predetermined time extension to the time limit of the inmate communication, and the processing subsystem 210 also suspends the inmate communication after the time limit (including the predetermined time extension) has expired.

If a request for a specific time extension has been requested, then method 500 in this example proceeds to step 509. At step 509, the inmate call processing server determines whether the inmate has been approved for a specific time extension. For example, time limit extension module 218 determines whether the inmate is eligible or approved for a specific time extension based on inmate profile data obtained from the inmate profile module 214 and/or communication database 220. If the inmate is not approved for the requested specific time extension, then method 500 in this example proceeds to step 508, at which time limit extension module 218 assigns a predetermined time extension to the inmate communication. At step 510, processing subsystem 210 then suspends the inmate communication after the time limit (including the predetermined time extension) has expired.

If the inmate is approved for the requested specific time extension, then method 500 in this example proceeds to step 511. At step 511, the inmate call processing server assigns the specific time extension requested by the inmate to the inmate communication. For example, time limit extension module 218 assigns the specific time extension requested by the inmate to the time limit of the inmate communication. At step 510, the inmate call processing server suspends the inmate communication after the specific time extension is over. For example, the processing subsystem 210 applies the specific time extension to the time limit of the inmate communication, and the processing subsystem 210 also suspends the inmate communication after the time limit (including the specific time extension) has expired.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
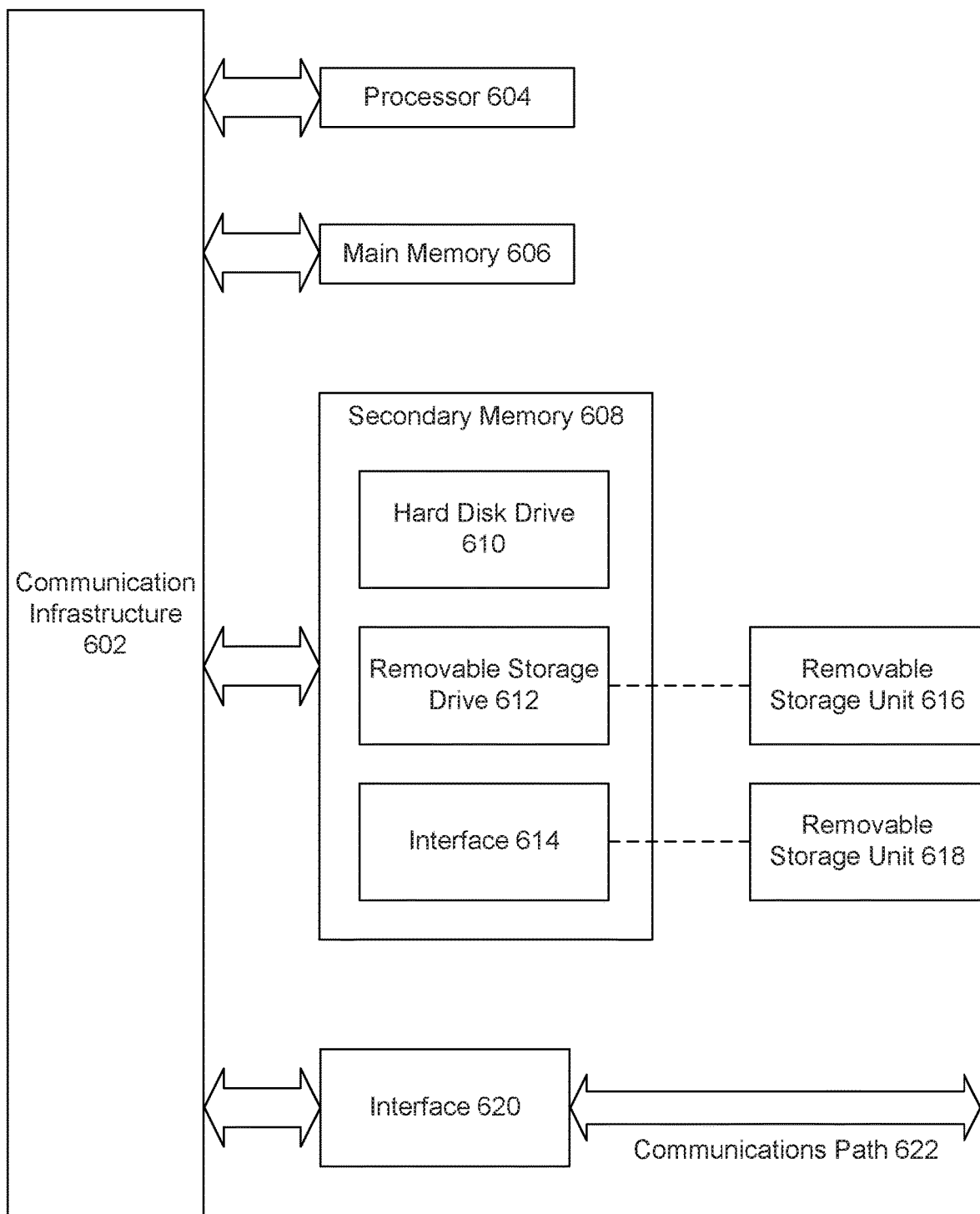
FIG. 6 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for inmate communications in a correctional facility, the system comprising:
   a profile subsystem that stores an inmate profile of an inmate, the inmate profile comprising a plurality of behaviors of the inmate;
   a communication processing subsystem comprising one or more processors configured to:
   identify a time limit for an inmate communication of the inmate based on a call recipient of the inmate communication and the plurality of behaviors of the inmate retrieved from the inmate profile;
   apply the time limit to the inmate communication of the inmate; and
   extend the time limit of the inmate communication by a predetermined length of time; and
   suspend the inmate communication after a duration of the inmate communication has reached an extended time limit.

2. The system of claim 1, wherein the extended time limit comprises the predetermined length of time added to the time limit of the inmate communication.

3. The system of claim 1, wherein the one or more processors of the communication processing subsystem are further configured to:
   determine whether the inmate is eligible or approved for a time extension of the inmate communication based on analyzing the inmate profile prior to extending the time limit of the inmate communication.

4. The system of claim 1, further comprising:
   a communication database, wherein to identify the time limit of the inmate communication of the inmate, the one or more processors of the communication processing subsystem are configured to:
   access the communication database;
   identify a list of approved contacts for the inmate within the communication database;
   match the call recipient of the inmate communication with an entry in the list of approved contacts; and
   identify a time limit value permitted for the call recipient based on the entry in the list of approved contacts.

5. The system of claim 1, wherein the inmate communication is a voice call, an audio communication, or video communication between the inmate and the call recipient of the inmate communication.

6. The system of claim 1, further comprising: a first communication device of the inmate configured to transmit communication data to a second communication device of the call recipient of the inmate communication.

7. The system of claim 6, wherein the first and second communication devices comprise at least one of a mobile device, a payphone, a landline phone, or a tablet computer.

8. A communication processing server for inmate communications in a correctional facility, the communication processing server comprising:

a database configured to store an inmate profile of an inmate, the inmate profile comprising a plurality of behaviors of the inmate;

a network interface device configured to communicate with the database and a first communication device; and at least one processor configured to:

identify a time limit for an inmate communication of the inmate based on a call recipient of the inmate communication and the plurality of behaviors of the inmate retrieved from the inmate profile;

apply the time limit to the inmate communication of the inmate; and extend the time limit of the inmate communication by a predetermined length of time; and suspend the inmate communication after a duration of the inmate communication has reached an extended time limit.

9. The communication processing server of claim 8, wherein the extended time limit comprises the predetermined length of time added to the time limit of the inmate communication.

10. The communication processing server of claim 8, wherein the at least one processor is further configured to:

determine whether the inmate is eligible or approved for a time extension of the inmate communication based on analyzing the inmate profile prior to extending the time limit of the inmate communication.

11. The communication processing server of claim 8, wherein to identify the time limit of the inmate communication of the inmate, the at least one processor is configured to:

identify a list of approved contacts for the inmate within the database;

match the call recipient of the inmate communication with an entry in the list of approved contacts; and identify a time limit value permitted for the call recipient based on the entry in the list of approved contacts.

12. The communication processing server of claim 8, wherein the inmate communication is a voice call, an audio communication, or video communication between the inmate and the call recipient of the inmate communication.

13. The communication processing server of claim 8, wherein the first communication device of the inmate is configured to transmit communication data to a second communication device of the call recipient of the inmate communication.

14. The communication processing server of claim 9, wherein the first and second communication devices comprise at least one of a mobile device, a payphone, a landline phone, or a tablet computer.

15. A method implemented by an inmate communication processing system, the method comprising:

identifying, by an inmate call processing server in the inmate communication processing system, a time limit for an inmate communication of an inmate based on a call recipient of the inmate communication and a plurality of behaviors of the inmate retrieved from an inmate profile;

applying, by at least one processor of the inmate call processing server, the time limit to the inmate communication of the inmate; and extending, by the at least one processor, the time limit of the inmate communication by a predetermined length of time; and suspending, by the at least one processor, the inmate communication after a duration of the inmate communication has reached an extended time limit.

16. The method of claim 15, wherein the extended time limit comprises the predetermined length of time added to the time limit of the inmate communication.

17. The method of claim 15, further comprising:

determining whether the inmate is eligible or approved for a time extension of the inmate communication based on analyzing the inmate profile prior to extending the time limit of the inmate communication.

18. The method of claim 15, wherein identifying the time limit of the inmate communication of the inmate comprises:

accessing the communication database;

accessing a database to identify a list of approved contacts for the inmate;

matching, by the at least one processor, the call recipient of the inmate communication with an entry in the list of approved contacts; and identifying, by the at least one processor, a time limit value permitted for the call recipient based on the entry in the list of approved contacts.

19. The Method of claim 15, wherein the inmate communication is a voice call, an audio communication, or video communication between the inmate and the call recipient of the inmate communication.

20. The method of claim 15, further comprising:

transmitting communication data from a first communication device of the inmate to a second communication device of the call recipient of the inmate communication.

* * * * *